United States Patent
Otsuka et al.

(10) Patent No.: US 7,433,245 B2
(45) Date of Patent: Oct. 7, 2008

(54) MEMORY CARD ABLE TO GUARANTEE A RECODING RATE AND MEMORY CARD SYSTEM USING THE MEMORY CARD

(75) Inventors: Takeshi Otsuka, Hyogo (JP); Haruo Ohta, Kyoto (JP)

(73) Assignee: Matsushita Electric industrial Co., Ltd., Osaka (JP)

(*) Notice: Subject to any disclaimer, the term of this patent is extended or adjusted under 35 U.S.C. 154(b) by 142 days.

(21) Appl. No.: 10/591,161

(22) PCT Filed: Mar. 28, 2006

(86) PCT No.: PCT/JP2005/005700

§ 371 (c)(1),
(2), (4) Date: Aug. 30, 2006

(87) PCT Pub. No.: WO2005/096220

PCT Pub. Date: Oct. 13, 2005

(65) Prior Publication Data

US 2007/0183198 A1 Aug. 9, 2007

(30) Foreign Application Priority Data

Mar. 31, 2004 (JP) ............................. 2004-107779

(51) Int. Cl.
*G11C 7/10* (2006.01)
(52) U.S. Cl. .................... 365/189.01; 711/103; 711/170
(58) Field of Classification Search ............ 365/185.33, 365/189.01 X, 189.07, 230.03, 189.01; 711/103 X, 711/170 X, 103, 170
See application file for complete search history.

(56) References Cited

U.S. PATENT DOCUMENTS

| | | | |
|---|---|---|---|
| 4,435,792 A * | 3/1984 | Bechtolsheim | ......... 365/189.02 |
| 6,438,086 B1 | 8/2002 | Haneda | |
| 2002/0059305 A1 | 5/2002 | Haneda | |
| 2003/0154206 A1 | 8/2003 | Kanai | |
| 2005/0080985 A1 | 4/2005 | Sasaki | |
| 2007/0145151 A1 * | 6/2007 | Nakamura et al. | .......... 235/492 |

FOREIGN PATENT DOCUMENTS

| | | |
|---|---|---|
| JP | 2000-122923 | 4/2000 |
| JP | 2002-335486 | 11/2002 |
| JP | 2003-308240 | 10/2003 |
| JP | 2004-005423 | 1/2004 |
| JP | 3525734 | 5/2004 |
| JP | 2005-051347 | 2/2005 |

* cited by examiner

*Primary Examiner*—VanThu Nguyen
(74) *Attorney, Agent, or Firm*—Wenderoth, Lind & Ponack, L.L.P.

(57) ABSTRACT

A memory card is equipped in a host apparatus and used for data recording. The memory card has a built-in flash memory and an internal ROM, and there is prestored a predetermined writable block size corresponding to a certain integral multiple of a size of an erase block. A write block size of a write command is issued by the host apparatus. The data size is detected and compared to the writable block size, so as to decide whether the write block size is an integral multiple of the writable block size, thereby judging whether write is permitted. Only when the write is permitted, data is written from the host apparatus into the memory card. If the write is not permitted, a response to inform an error is returned to the host apparatus.

8 Claims, 13 Drawing Sheets

FIG.2 PRIOR ART
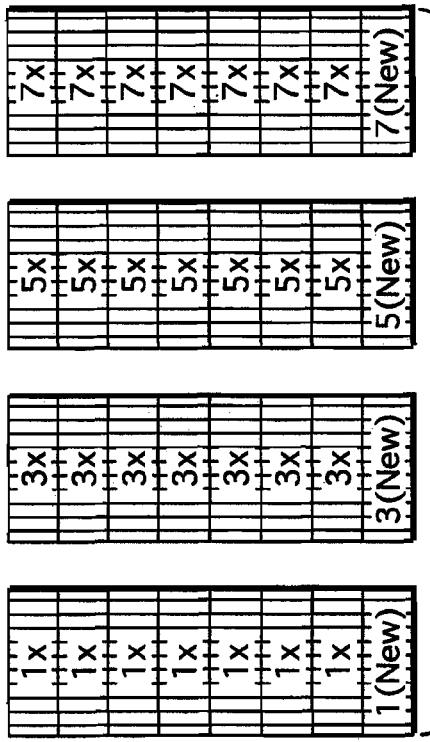
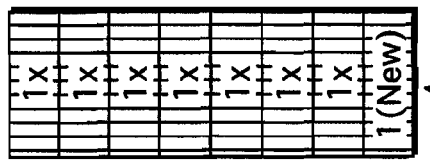
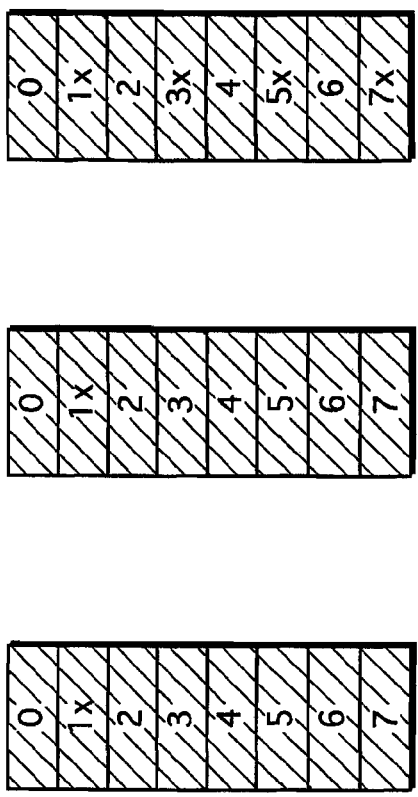

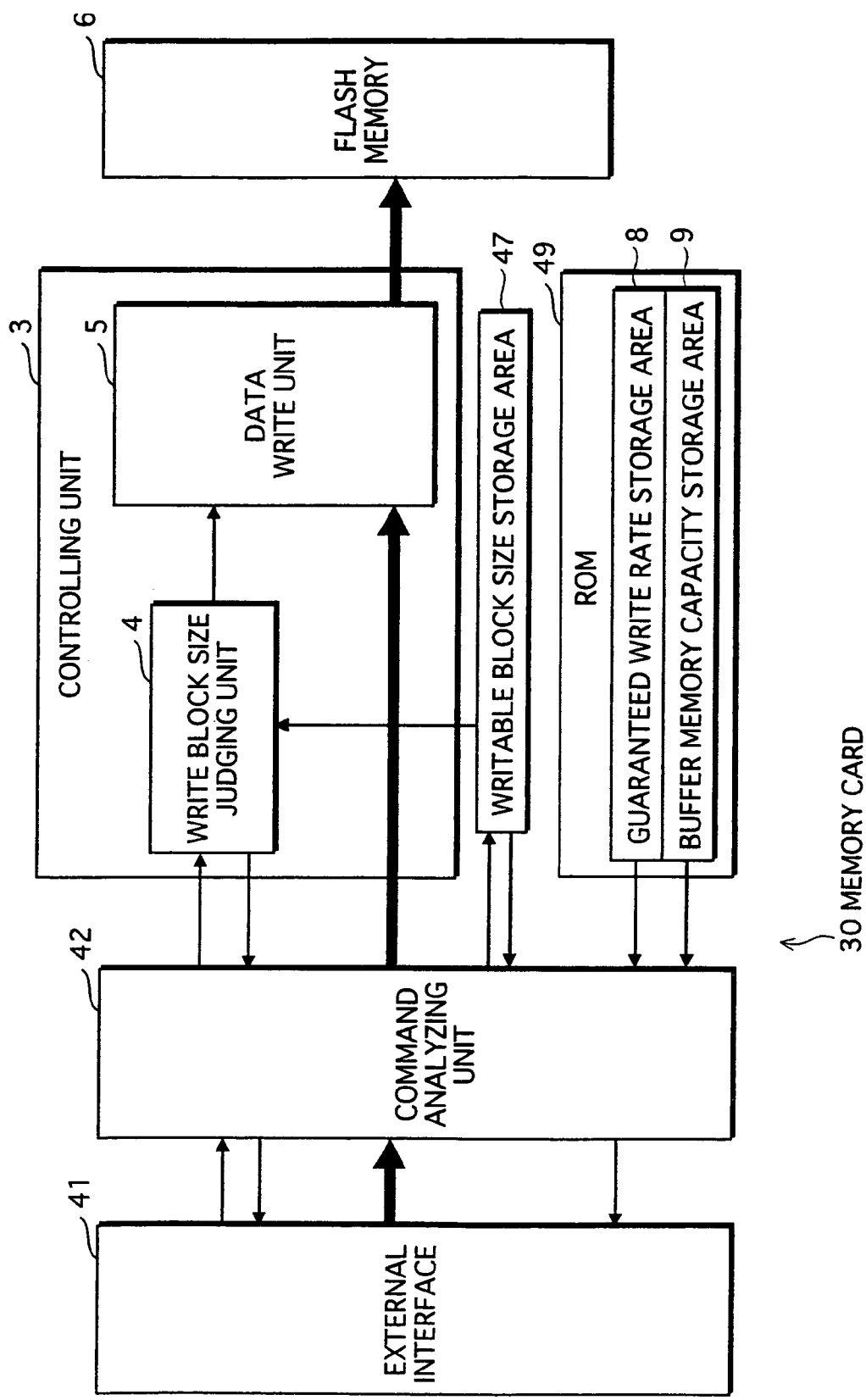

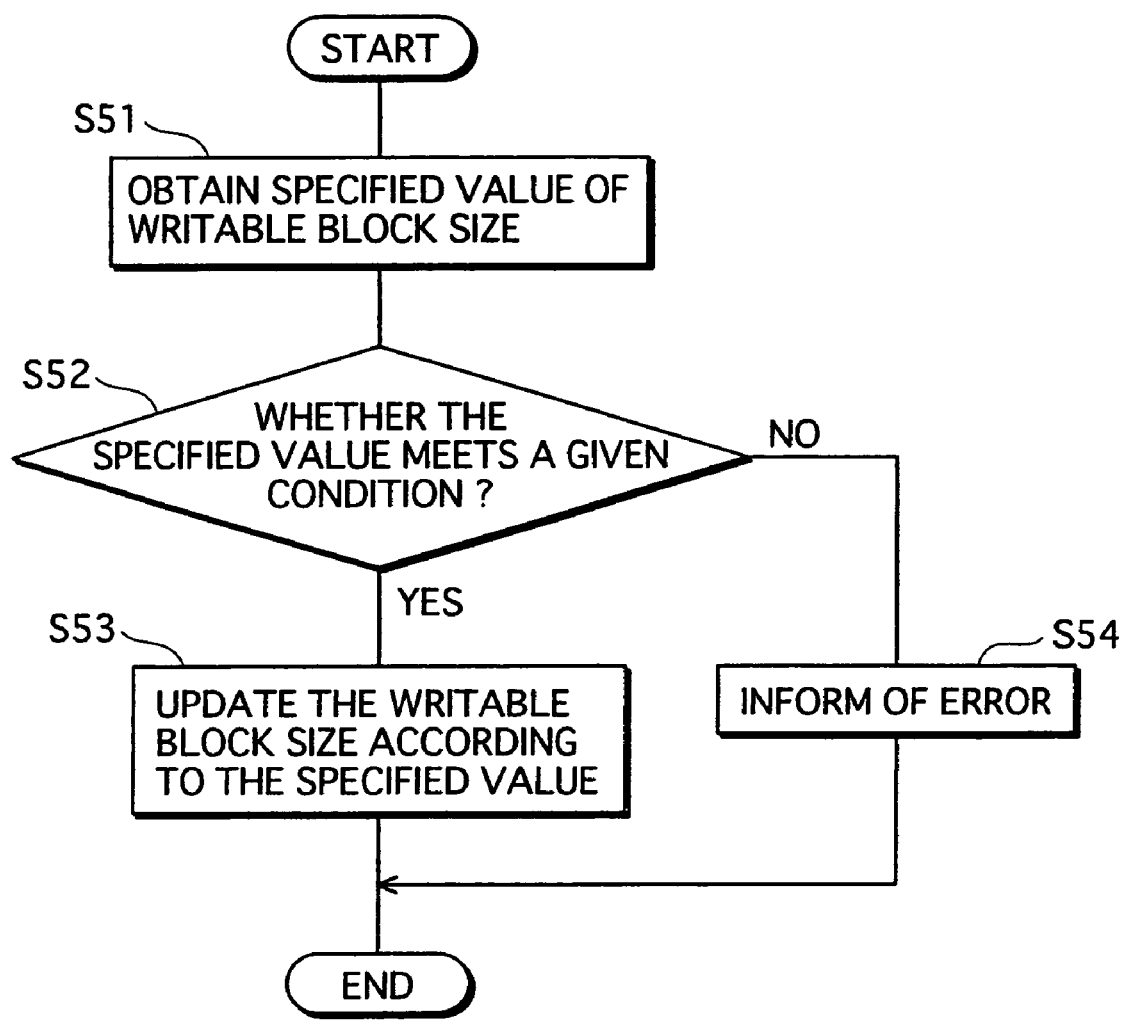

ized and ultraslim. Therefore, with its convenience in handling being appreciated, memory cards are widely used in digital apparatuses such as digital cameras to record data. For example, memory cards are used as recording media for recording moving images of relatively low transmission rate such as MPEG4(Moving Picture Experts Group 4).

MEMORY CARD ABLE TO GUARANTEE A RECODING RATE AND MEMORY CARD SYSTEM USING THE MEMORY CARD

TECHNICAL FIELD

The present invention relates to a memory card including a flash memory, and a memory card system for recording data into the memory card.

BACKGROUND ART

Memory cards that are card-type recording media including a flash memory, such as SD(Secure Digital) cards, are subminiature and ultraslim. Therefore, with its convenience in handling being appreciated, memory cards are widely used in digital apparatuses such as digital cameras to record data. For example, memory cards are used as recording media for recording moving images of relatively low transmission rate such as MPEG4(Moving Picture Experts Group 4).

A flash memory included in the aforementioned memory card generally comprises a plurality of blocks of a predetermined size (hereafter referred to as the "erase block") each of which to be the minimum unit to erase recorded data. When erasing data, an erasing process is performed in units of the erase block. The erase block comprises a plurality of pages of a predetermined size (hereafter referred to as the "write page"), and data is written in units of the write page on write pages from which data have been erased.

FIG. 1 shows how data is written into the memory card.

FIG. 1 shows an example of a change of a state when rewriting data only on one write page out of two write pages that make up an erase block, taking, as a target to be rewritten, two erase blocks in a flash memory that is composed of erase blocks each of which comprises two 512-byte write pages. Each state is indicated by State 901a to 901d.

In two erase blocks of a State 901a in FIG. 1, one (the upper) shows an erase block in which data A and data B have been written, another (the lower) shows an erase block from which data has been erased.

When rewriting the data B in the flash memory of the State 901a, data B(NEW) that has been renewed is written on one of the two write pages on the lower erase block from which the data have been erased. As a result of this, the flash memory changes to a State 901b.

Next, the data A that have been written in the upper erase block is saved into the lower erase block, and then a State 901c is created. Then data in the upper erase block is erased. This would make the flash memory change to a State 901d.

Here, a sequence of a process employed when rewriting data on a certain write page described above is called a "drag-in save".

Due to the drag-in save, in a case where a host apparatus issues a write command to write data on one write page, as one example, the number of write pages on which data is actually written becomes larger than the number of the write pages on which the write command instructed to write data. The actual writing speed in the drag-in save is therefore lower than the writing speed recognized by the host apparatus.

In regard to such a memory card, to realize a high-speed recording, the inventors of the present invention invented a system in which write commands are issued to a memory card to write data in blocks the size of which is an integral multiple of the size of the erase block of a flash memory of the memory card. The inventors have already filed an application for patent in Japan (Refer to Japanese Patent Application No. 2003-121178).

Also, as a system for realizing a high-speed recording, a patent publication in Japan discloses a system in which erase blocks wherein all of write pages that are recordable are searched among erase blocks of a memory card that is composed of several flash memories, and then data is recorded in parallel into several erase blocks (Refer to Document 1).

Meanwhile, to use a memory card as a recording medium to recordvideo data of long hours that is output at as high a transfer rate as 4 MB/sec, as in the case where the data is output from a digital video apparatus in the DV (Digital Video) format, a guarantee that the data is recorded at a recording rate higher than a predetermined recording rate is necessary.

However, the system for a high-speed recording of the conventional memory card cannot guarantee a lowest limit of the recording rate (hereafter referred to as the "lowest recording rate") as a recording speed of the memory card. The guarantee of the lowest recording rate denotes that data continues to be written into the memory card at the lowest recording rate.

It should be noted here that a memory card whose highest recording rate is approximately 10 MB/sec, as one example, is conventionally sold. However, this memory card does not have a spec generated taking into account a variation in flash memories, and does not guarantee the lowest recording rate.

The following explains why it is difficult for the conventional system for a high-speed recording to guarantee the lowest recording rate.

Generally, personal computers (PC) employ a file allocation table (FAT) system as a file system. In the FAT system, a sector that is to be an access unit is basically defined as having 512 bytes, and a write command is issued from the PC specifying a write block size as 512 bytes, in other words, in units of 512 bytes. Referring to this as a premise, the following explains a case where the PC records data into a memory card including a plurality of erase blocks each of which is composed of eight 512-byte write pages.

A memory card in which an erase block is composed of eight write pages often employs the following algorithm.

Generally, a memory card has a predetermined number (for example, forty) of extra erase blocks for work separate from the erase blocks needed to realize a guaranteed recording capacity. These extra erase blocks are used as blocks for work (hereafter referred to as the "work block").

In a case where a PC needs to rewrite data over and over again in one sector, if this is performed so that the data is written over and over again on a same write page, the number of times the data is recorded on the write page intensively increases and a lifetime of the flash memory is shortened. Therefore, in order to avoid this, a control using the work blocks is performed.

For example, when repeatedly overwriting data into a memory card in which another data has been recorded in erase blocks corresponding to a total recording capacity, the data is recorded sequentially into forty work blocks. Then, after the data is written in all of the work blocks, the data in the work blocks as erase blocks are erased and another data is recorded.

FIG. 2 shows a change of a state of a memory card including erase blocks each of which is composed of eight 512-byte write pages.

In a State 902a, sector 1 has been rewritten once, in more detail, sector 1 has been rewritten once by rewriting data on a write page among work blocks that is different from an original write page. In a State 902b, sector 1 has been rewritten eight times. Further, in a State 902c, sector 3, sector 5, and sector 7 have been rewritten eight times.

Here, in FIG. 2, a mark x indicates that a content of a write page is invalidated. For example, 1x indicates that the write page that has a content of sector 1 has been invalidated. Here in a memory card, validness or invalidness of each of the write pages is managed by the FAT table.

Hereinafter, a write page on which data has been written and has been invalidated is called an "invalid page", and a write page on which data has been written and has not been invalidated is called a "valid page". In FIG. 2, a mark New indicates that a content of sector has been updated. For example, 1 (New) shows the sector 1 whose content has been updated.

The conventional system for a high-speed recording does not perform, in the State 902a, the drag-in save shown by the State 901c in FIG. 1. The reason is to prevent a drastic diminishment of a recording rate because if the drag-in save is performed, in order to write one 512-byte of data on a write page, 512 bytes×8, in other words, data of four kilo bytes is written on the write page, and this would diminish a recording rate.

With respect to the number of work blocks, forty work blocks that originally exist are reduced to thirty six in the State 902c, and further after sector 2, sector 4, and sector 6 are rewritten eight times as well, the number of the work blocks is reduced to thirty three.

In a case where the erase block is composed of eight write pages, the sectors (for example, sector 1 to sector 8), which originally correspond to one erase block, may disperse into eight erase blocks at the largest. This phenomenon is referred to as "logical dispersion".

When the logical dispersion occurs, the number of the work blocks drastically decreases, and it is likely to reach a minimum number (For example, one as a preset value). If the number of work blocks reaches the minimum number, a task to search empty blocks is executed to generate new work blocks.

Here, the emptyblock search denotes to search invalid pages shown by x in FIG. 2 among all of the erase blocks so that the erase blocks from which data has been erased can be treated as the work blocks, in other words, to put the erase blocks into the state in which valid data is not recorded. Then, from the erase blocks having the invalid pages, valid pages are saved into work blocks, and data is erased from the erase blocks to recreate the erase blocks as new work blocks.

The above process is shown in FIG. 3. FIG. 3 shows states before and after the valid pages are saved into a work block from the erase block including invalid pages.

In FIG. 3, the upper shows erase blocks that have been detected by the empty block searching task and can be converted into work blocks, and the lower shows a work block. A State 903b shows a state generated by saving the valid pages of State 903a into the work block.

In the State 903b, all of the three erase blocks in the upper portion are composed of invalid pages, and it is possible to newly generate three work blocks by erasing the data from these erase blocks.

The empty block searches described above diminish a recording rate of the memory card.

The memory card can be included in a plurality of host apparatuses one at a time as necessary. Therefore, even if the host apparatus writes data in units of erase blocks, when the host apparatus cannot identify a host apparatus which has written data into the memory card before, the empty block search needs to be performed. For example, in a case where the host apparatus writes data in units of erase blocks into the memory card in which data has been written in units of sectors by a PC, it is likely that the empty block search occurs and a recording rate of the memory card diminishes. This makes it difficult to guarantee the lowest recording rate of the memory card.

Document 1: Japanese Unexamined patent Publication No. 2000-122923

DISCLOSURE OF THE INVENTION

Problem to Be Solved

The object of the present invention, which has been made in view of the aforementioned problem, is to provide a memory card that can guarantee a certain lowest recording rate and a memory card system to record data using the memory card.

Means to Solve the Problem

To achieve the above problem, a memory card of the present invention comprises: a flash memory; an external interface unit operable to transfer data to and from a host apparatus; a storage unit that prestores a predetermined writable block size; and a controlling unit operable, when receiving through the external interface unit a write command which specifies a write block size, to (a) judge whether the write block size satisfies a predetermined condition in relation to the writable block size and (b) perform a control operation concerning whether to permit writing of data into the flash memory according to a result of the judgment.

Here the write command instructs to write data into the flash memory and specifies the write block size that is a data size of a part of data which the host apparatus records. The write command is transmitted from the host apparatus to the memory card. Also, the writable block size shows a predetermined data size and is used as data to judge whether to permit writing of data with respect to the write command. It should be noted here that the control operation concerning whether to permit writing of data denotes a control on whether to write data into the memory card or not. When it is judged not to write data, the control unit sends a response, to the host apparatus, to inform an error showing a rejection against the write command, as one example.

Effect of the Invention

The memory card that has above structure can judge whether the write block size that is a size of data which the host apparatus records and is specified by the write command satisfies a predetermined condition to guarantee a certain lowest recording rate, and can perform a control operation concerning whether to permit writing of data. When the write block size does not satisfy the predetermined condition, the memory card sends a response to inform an error against the write command and does not execute writing of data. Therefore, if the memory card is used to record data sequentially by a plurality of different host apparatuses, it is possible to guarantee the lowest recording rate.

The memory card of the present invention has a structure, as material for a judgment, in which the writable block size that is predetermined in relation with a size of the erase block of the flash memory is stored in a nonvolatile memory and like that. In order to guarantee a speed of writing of data into the flash memory above a certain level, the write block size should satisfy a predetermined condition in relation to the writable block size. From this perspective, if a data value of the writable block size prestored in the memory card is determined taking into account a size of the erase block, it is possible to guarantee writing of data at a certain lowest recording rate.

Also, the writable block size may be a predetermined integral multiple of a size of an erase block in the flash memory, and the predetermined condition may be that the write block size is an integral multiple of the writable block size. Further, the controlling unit may perform the control operation to write data into the flash memory only if the predetermined condition is satisfied.

With this arrangement, taking the writable block size that is a predetermined value of an integral multiple of the erase block as a minimum unit, only when the write block size is an integral multiple of the writable block size, data of the write block size is written into the flash memory. Therefore, if the memory card is sequentially equipped in a plurality of different host apparatus, a drag-in save does not occur when writing the data into the flash memory and each host apparatus can continuously write the data into the flash memory at a certain lowest recording rate. Consequently, the memory card can guarantee the lowest recording rate and is suitable for a real-time recoding of moving images.

Further, the memory card comprises a transmission unit operable to read the writable block size from the storage unit and transmit the read writable block size to the host apparatus through the external interface unit.

With this arrangement, the host apparatus can obtain the writable block size from the memory card, and can determine the write block size in the write command, in other words, a data size to be written at one time based on the writable block size.

Further, the storage unit may prestore a guaranteed write rate that indicates a lowest recording rate guaranteed as long as data is written into the flash memory in units of the writable block size, and the transmission unit may further read the guaranteed write rate from the storage unit and transmits the read guaranteed write rate to the host apparatus through the external interface unit.

With this arrangement, as long as the host apparatus obtains the writable block size from the memory card and writes data taking the writable block size as a minimum unit, the host apparatus also obtains the guaranteed write rate that is the lowest recording rate guaranteed. In other words, even if the host apparatus sequentially uses a plurality of memory cards each of which prestores a different writable block size, the host apparatus can properly obtain the writable block size of each memory card and write data into the memory card in units of a proper write block size based on the writable block size. For example, with respect to the host apparatus that compresses an image signal and records it into the memory card, as long as the host apparatus adjusts the write block size by changing a compression rate according to a writable block size of each memory card, it is possible to write data in real time maintaining the lowest recording rate.

Further, the storage unit may prestore a conditional guaranteed write rate that indicates a lowest recording rate guaranteed as long as data is written into the flash memory in units of a certain integral multiple of the writable block size, and the transmission unit may read the conditional guaranteed write rate from the storage unit and transmits the read conditional guaranteed write rate to the host apparatus through the external interface unit.

With this arrangement, in a case where the write block size of the memory card is 128 kilo-byte (KB) as one example, the host apparatus can obtain, in addition to the guaranteed write rate that indicates the lowest recording rate guaranteed on writing data in units of 128 KB, the conditional guaranteed write rate that indicates the lowest recording rate on writing data in units of 256 KB that is twice the writable block size. Then the host apparatus can properly determine the write block size as a size of data which the host apparatus records, based on a lowest limit of the recording rate required.

Also, the storage unit may further prestore a buffer memory capacity data that is predetermined to indicate a capacity required for a buffer memory that is equipped in the host apparatus, to guarantee the lowest recording rate indicated by the guaranteed write rate, and the transmission unit may further read the buffer memory capacity data from the storage unit and transmits the read buffer memory capacity data to the host apparatus through the external interface unit.

With this arrangement, the host apparatus can obtain the buffer memory capacity data from the memory card, and in a case where the host apparatus needs to write data continuously to the memory card at the lowest recording rate, it is possible to adjust a capacity of the buffer memory. The buffer memory is effective in guaranteeing a certain recording rate when a recording rate fluctuation of the memory card and an error retry are taken into account.

Further, the memory card may comprise a writable block size update unit operable, responding to a request from the host apparatus that is received through the external interface unit, to rewrite the writable block size prestored in the storage unit so that the writable block size becomes smaller than the original writable block size.

With this arrangement, it is possible, when the memory card is continuously used for a purpose in which a lowest recording rate prestored in the memory card does not need to be guaranteed, to update the writable block size to be smaller than the original and to record data into the memory card in units of smaller write block size. The original lowest recording rate is guaranteed before this update, however, after this update, the original lowest recording rate can not be guaranteed.

Further, the memory card may comprise an update unit operable, responding to a request from the host apparatus that is received through the external interface unit, to rewrite the writable block size prestored in the storage unit so that the writable block size becomes smaller than the original writable block size, and then update the guaranteed write rate according to the rewritten writable block size.

With this arrangement, for example, in a case where a size of the erase block is 128 KB and the original writable block size is 256 KB, when the writable block size is updated to 128 KB according to instruction by the host apparatus, it is possible to transmit the lowest recording rate corresponding to 128 KB that is prestored in the memory card to the host apparatus including the memory card as a new guaranteed write rate. Also, in a case where the writable block size is updated according to an instruction by the host apparatus, the guaranteed write rate is updated so that the guaranteed write rate becomes a predetermined value (zero, as one example) that indicates impossibility of guarantee, to show that it became impossible to guarantee the lowest recording rate based on the original guaranteed write rate, and then it is possible to transmit this update to the host apparatus that will include the memory card later.

A memory card system of the present invention comprises the memory card; and a host apparatus that transfers data to and from the memory card, wherein the host apparatus includes a read-modify-write unit operable, when a size of a first data to be written into the memory card does not reach the writable block size, to (a) read a second data from a flash memory that is included in the memory card through the external interface unit, and (b) put the first data and the second data together to generate a third data so that the third data has the same size as the writable block size, and then (c) transmit a write command to the memory card to write the third data into the flash memory.

With this structure, when data to be written into the memory card by the host apparatus does not reach the writable block size, the host apparatus preliminarily reads another data from the memory card and puts these data together to rebuild data of the writable block size. Then, the host apparatus issues a write command to the memory card in order to write the rebuilt data, therefore, it is possible to write the data into the memory card with the lowest recording rate being guaranteed. Consequently, the memory card system is used as a recording system to record in real time, into the memory card, received digital broadcast programs or moving images taken by Digital Videos.

BRIEF DESCRIPTION OF THE DRAWINGS

FIG. 2 shows a change of a state of a memory card including erase blocks.

Figure 1:
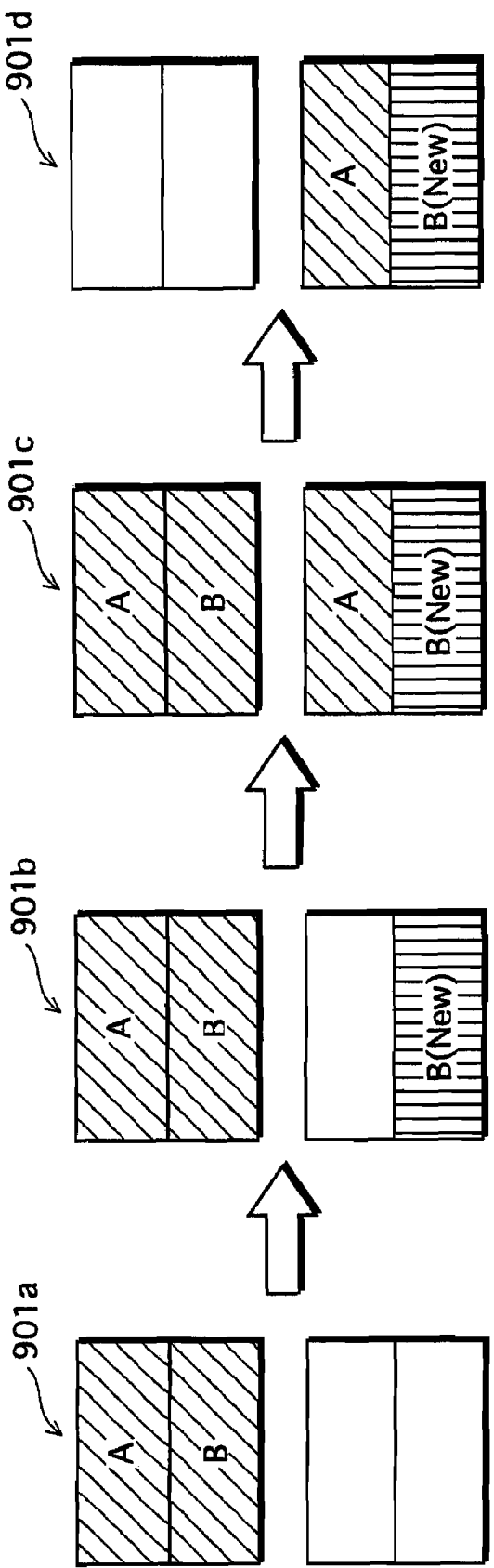
FIG. 1 shows how data is written into the memory card.
Figure 3:
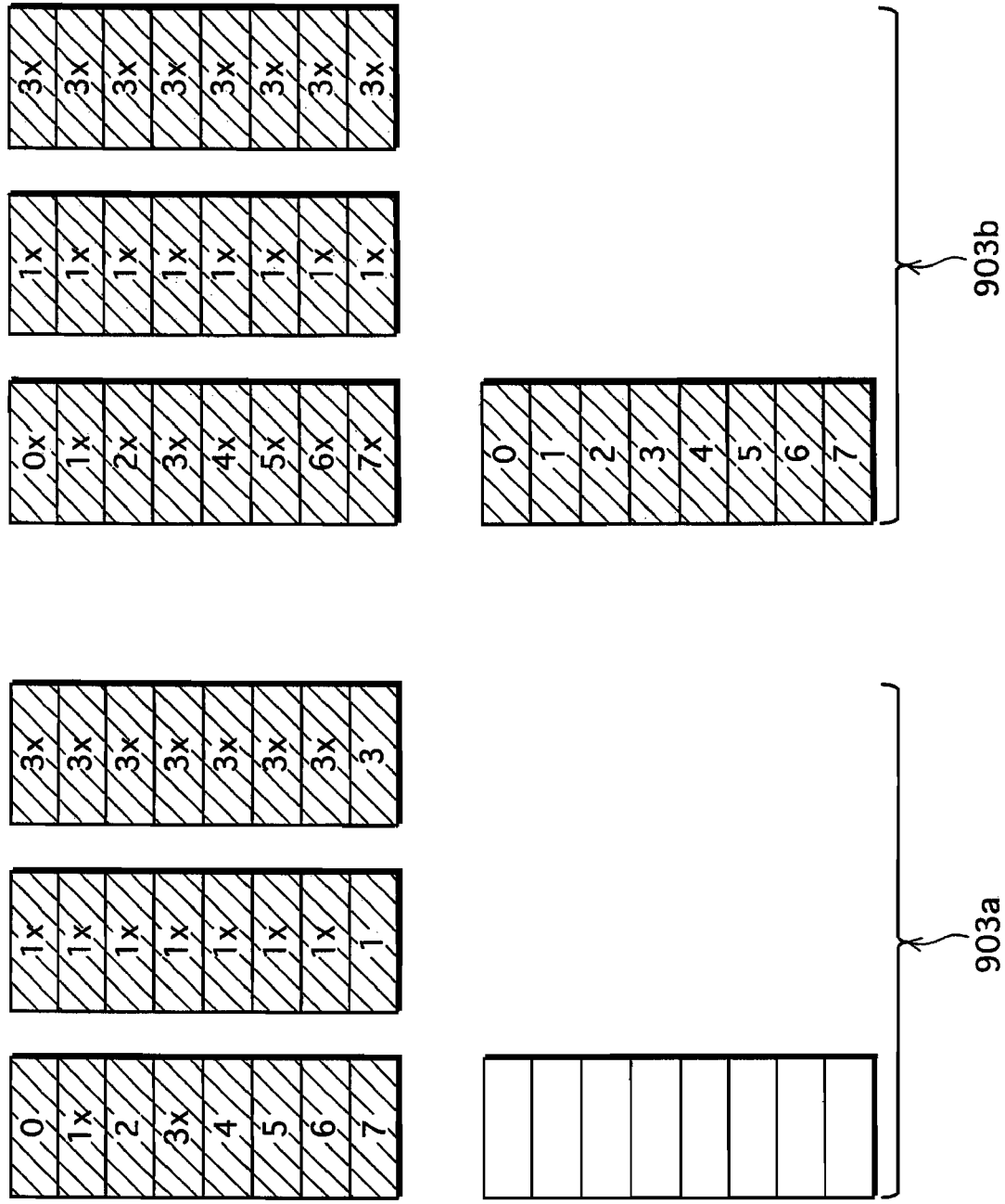

The FIG. 3 shows states before and after the valid pages are saved into a work block from the erase block including invalid pages.

Figure 4:
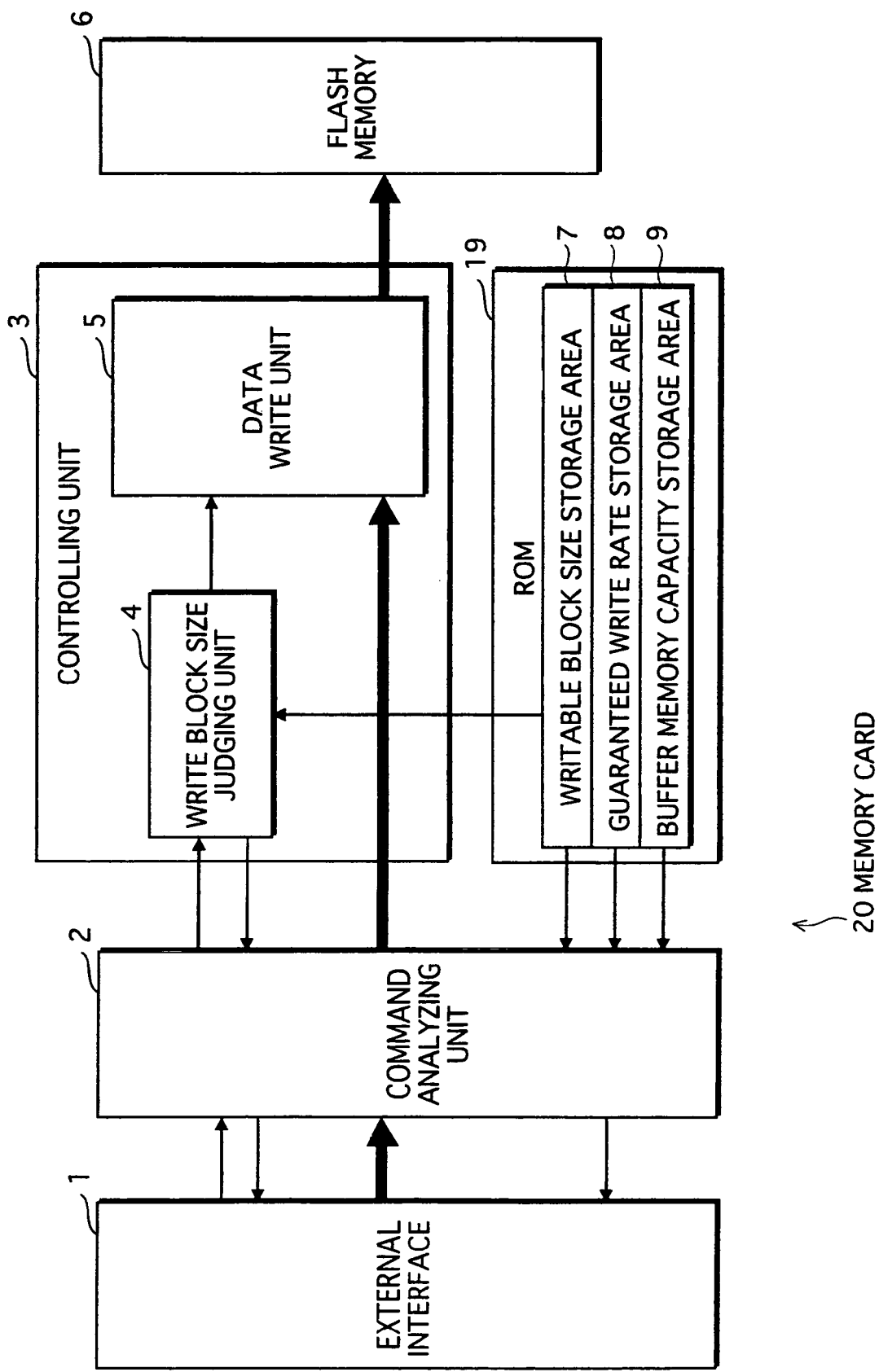

FIG. 4 shows a general structure of a memory card of the first embodiment.

Figure 5:
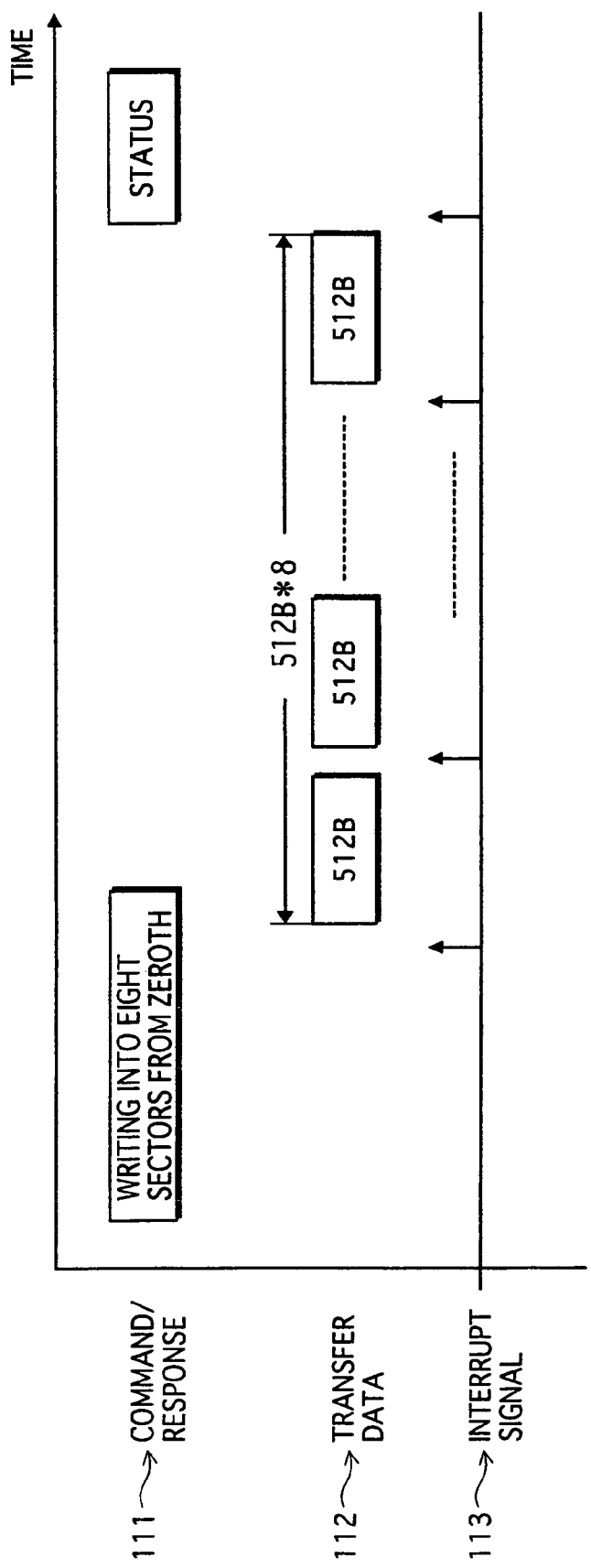

FIG. 5 shows a transmission timing of signals and data that are transmitted between the host apparatus and the memory card according to a write command.

Figure 6A:

FIG. 6A shows a relationship between sectors and erase blocks in a flash memory.

Figure 6B:
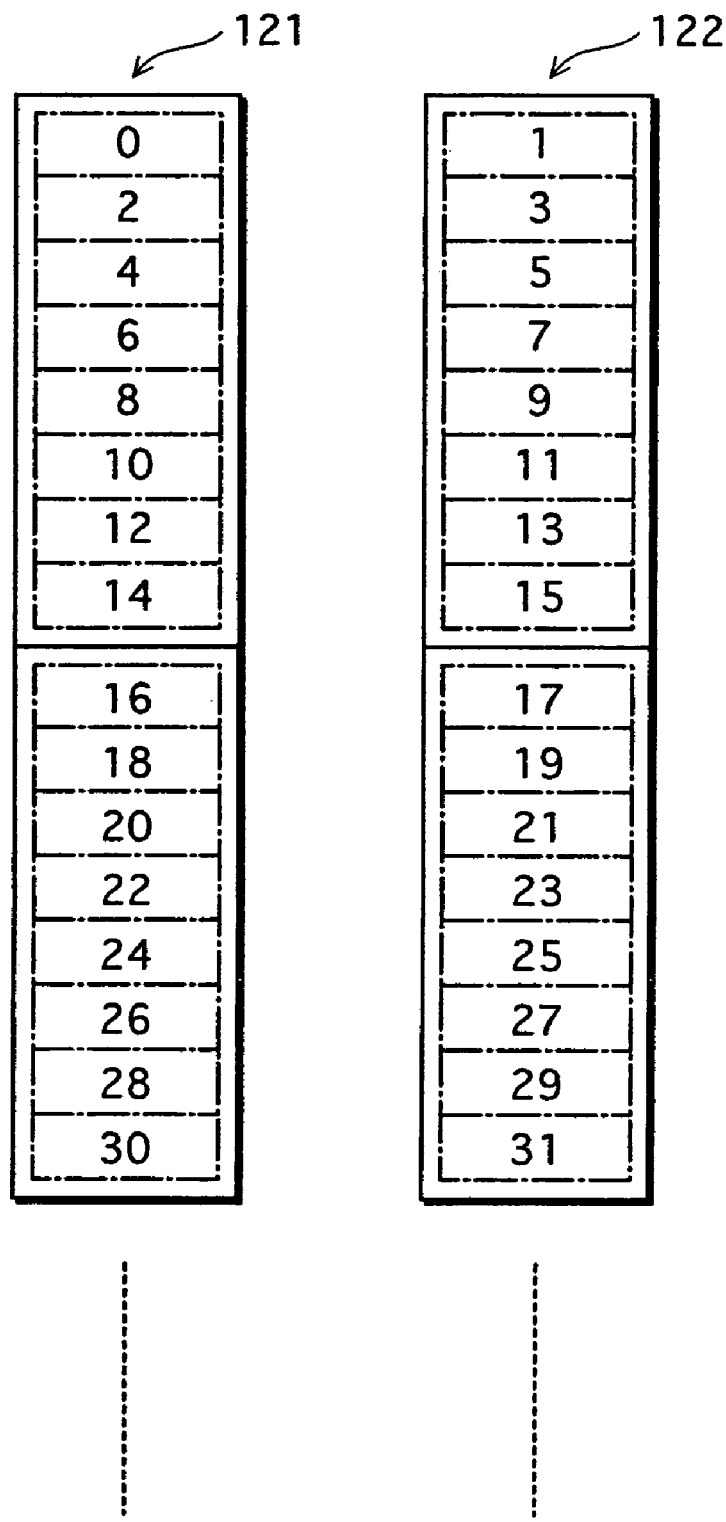

FIG. 6B shows a relationship between sectors and erase blocks when a memory card includes two or more flash memories.

Figure 7:
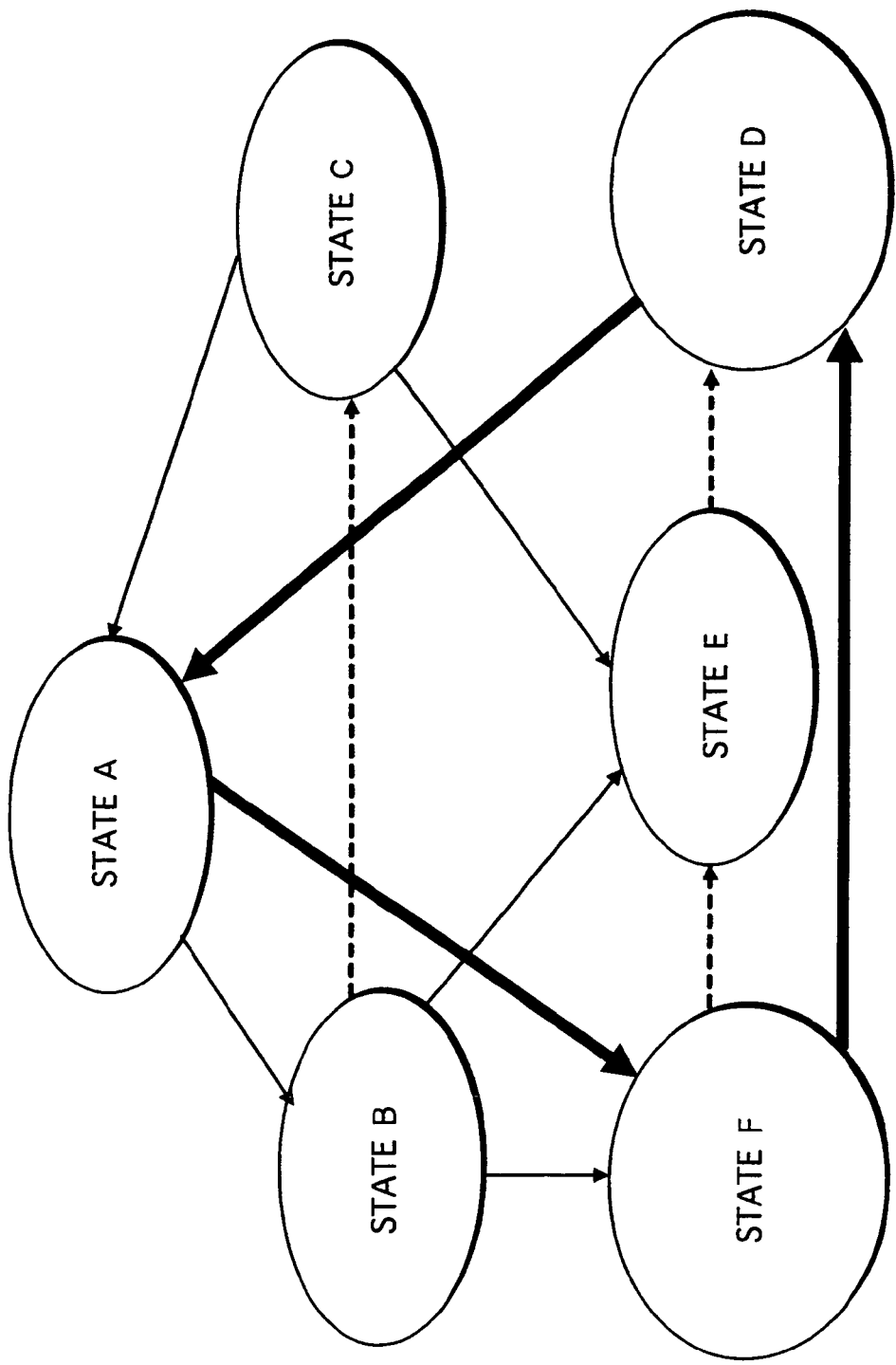

FIG. 7 is a state transition diagram of erase blocks that make up the memory card.

Figure 8:
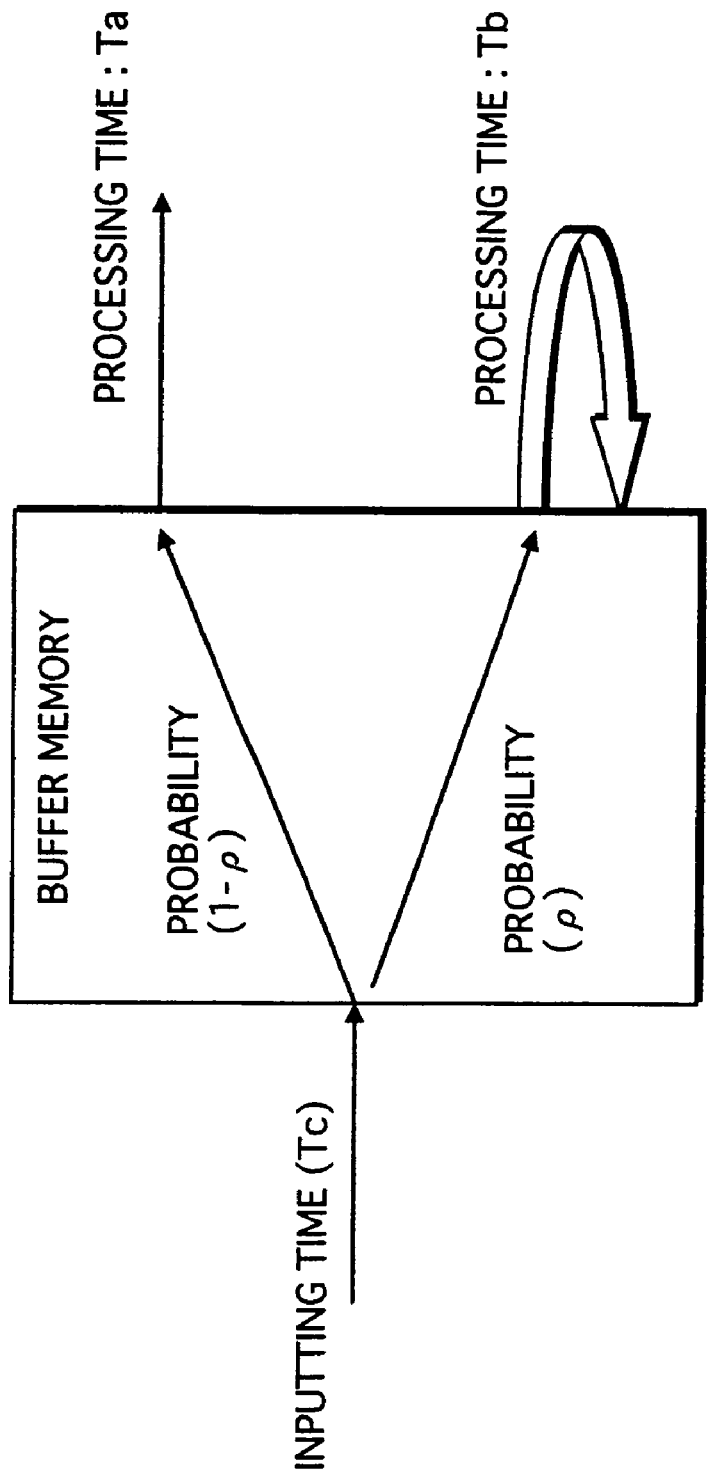

FIG. 8 is a system diagram of a queue calculation to obtain buffer memory capacity required.

Figure 9:
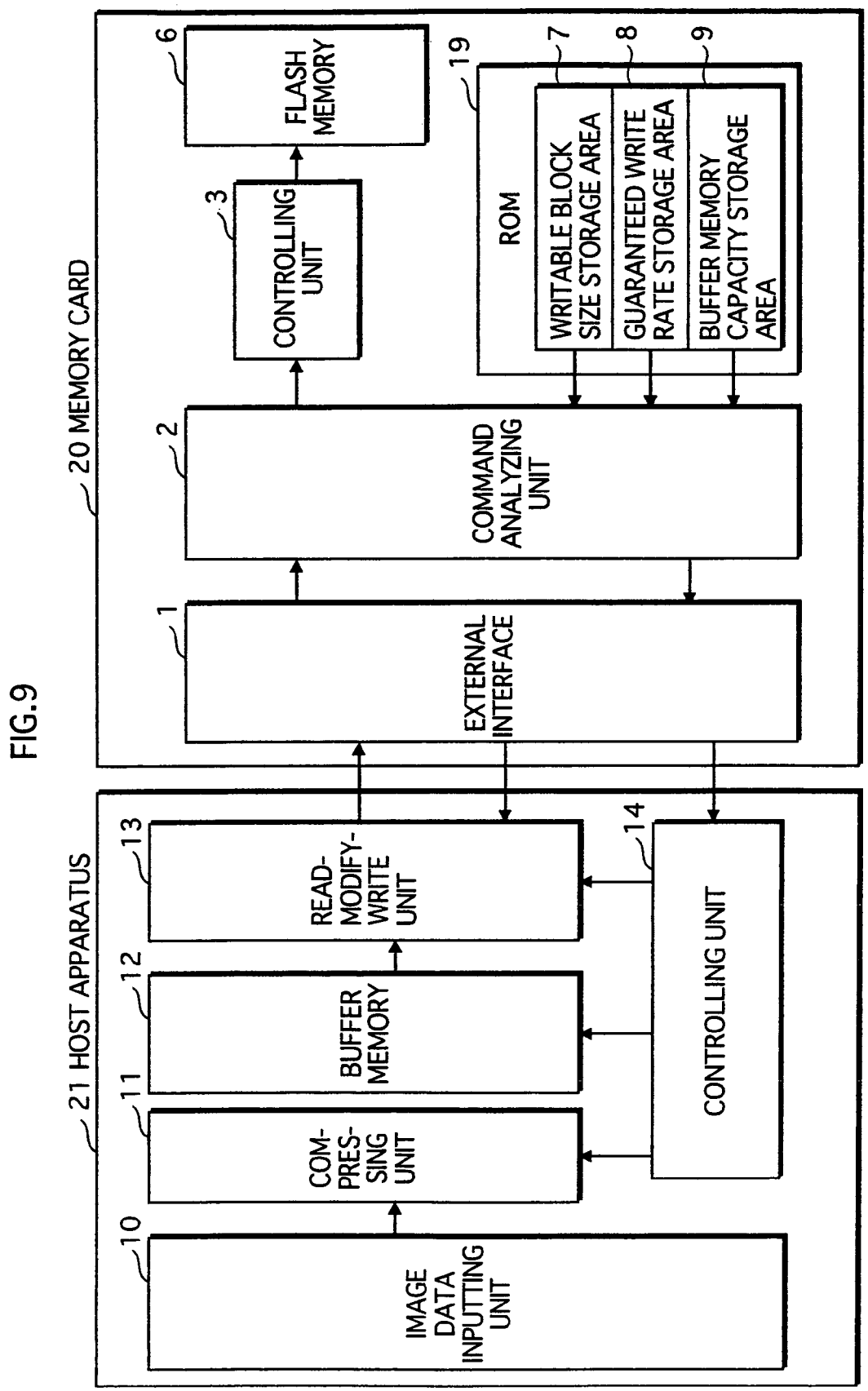

FIG. 9 shows a general structure of a memory card system according to the second embodiment.

Figure 10:
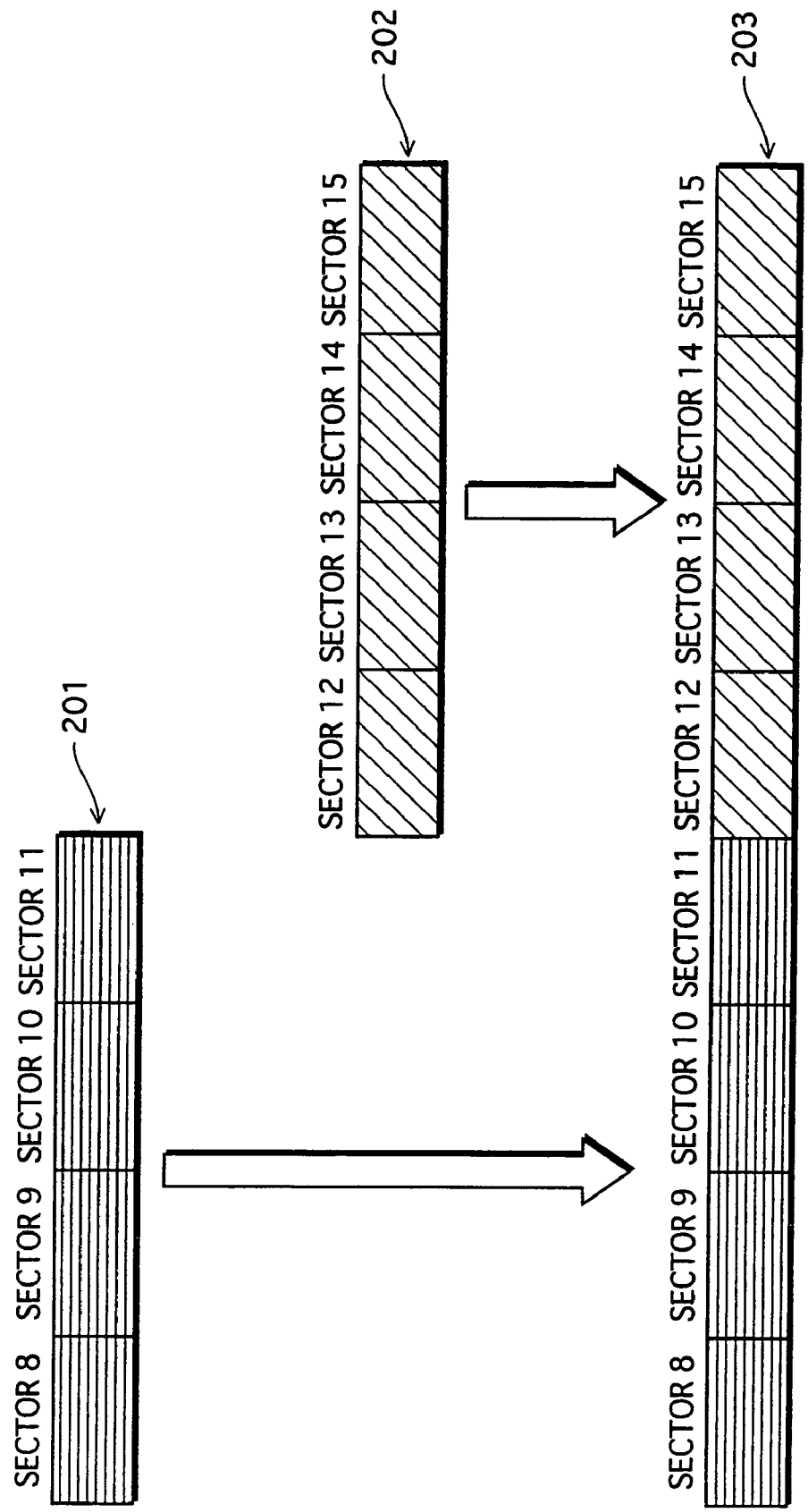

FIG. 10 shows an image of how a read-modify-write is performed.

FIG. 11 shows a general structure of the memory card according to the third embodiment.

FIG. 12 is a flow chart that shows the response process against the command that instructs an update of the writable block size.

EXPLANATION OF REFERENCES 1, 41 external interface unit
2, 42 command analyzing unit
3 controlling unit
4 write block size judging unit
5 data write unit
6 flash memory
7, 47 writable block size storage unit
8 guaranteed write rate storage unit
9 buffer memory capacity storage unit
10 image data input unit
11 compressing unit
12 buffer memory
13 read-modify-write unit
14 controlling unit
19, 49 ROM
20, 30 memory card
21 host apparatus

BEST MODE FOR CARRYING OUT THE INVENTION

First Embodiment

The following describes a memory card of the first embodiment according to the present invention.

FIG. 4 shows a general structure of a memory card of the first embodiment.

Here, in FIG. 4, thick arrows show the flow of data from a host apparatus to be recorded into a memory card 20, and thin arrows show the flow of control signal or control data.

As shown in FIG. 4, the memory card 20 comprises an external interface unit 1, a command analyzing unit 2, a controlling unit 3, a flash memory 6, and a ROM (Read Only Memory) 19 that includes a writable block size storage area 7, a guaranteed write rate storage area 8, and a buffer memory capacity storage area 9.

Here, the external interface unit 1 receives a command from a host apparatus and sends, to the host apparatus, a response against the command issued by the host apparatus. The external interface unit 1 also transfers data.

The command analyzing unit 2 analyzes the command received by the external interface unit 1. There are various kinds of commands, such as a write command to write data into a flash memory included in the memory card, a read command to read data from the flash memory, and a command to read contents stored in the writable block size storage area 7, the guaranteed write rate storage area 8, or the buffer memory capacity storage area 9. The write command to be received from the host apparatus specifies a write block size that denotes an amount of data to be written and a starting sector from which the data is written.

A control system and a control performance of the read command are the same as those of the conventional memory card, and an explanation is omitted. If the command analyzing unit 2 analyzes a command as a command to read contents stored in the ROM 19, the command analyzing unit 2 reads the contents and sends the read contents to the host apparatus through the external interface unit 1 as a response against the command.

The writable block size storage area 7 is an area where a writable block size is prestored, the writable block size being a size of data which the host apparatus is allowed to record. In the guaranteed write rate storage area 8, a guaranteed write rate that shows the lowest recording rate guaranteed is prestored. In the buffer memory capacity storage area 9, a buffer memory capacity data that is requested to the host apparatus to assure the guaranteed write rate is prestored.

The controlling unit 3 includes a write block size judging unit 4 and a data write unit 5, and accesses the flash memory 6 by reading or writing data, according to an analysis by the command analyzing unit 2.

The write block size judging unit 4 judges, in reference to the writable block size prestored in the writable block size storage area 7, whether a write block size specified by the write command that is analyzed by the command analyzing unit 2 is appropriate or not. If the write block size is appropriate, the write block size judging unit 4 instructs the data write unit 5 to write data according to the write command. If the write block size is not appropriate, the write block size judging unit 4 sends a response to inform an error to the host apparatus through the external interface unit 1 and other units. When the host apparatus receives the response informing an error, it cancels writing of data. On the other hand, when the host apparatus does not receive the response to inform an error, it continuously sends data of the write block size to the memory card.

The following explains how data is written into the memory card.

First, the host apparatus issues, through the external interface unit 1, a write command being a control command to the memory card. Here, the explanation is provided on a case where a command to write data into eight sectors consecutively from the zeroth is issued.

FIG. 5 shows a transmission timing of signals and data that are transmitted between the host apparatus and the memory card according to a write command.

In FIG. 5, the row 111 for command/response indicates a transition of a command from the host apparatus to the memory card 20 and a response against the command from the memory card 20. A transfer of data to be written into a memory card starts after the write command is issued by the host apparatus. When the data is transferred properly, a status value that shows a completion of data transfer is sent to the host apparatus from the memory card 20 after a data transfer is completed.

In FIG. 5, the row 112 for transfer data indicates how eight sectors of data each of which is 512 bytes (512B) are transferred to the memory card from the host apparatus.

In FIG. 5, the row 113 for interrupt signal indicates how an interruption signal is asserted to the host apparatus from the memory card 20. The memory card 20 asserts the interruption signal each time the memory card is ready to receive next 512 bytes of data. Also, when a transfer of eight sectors of data and then a preparation of a status are completed, the memory card 20 asserts the interruption signal to inform the host apparatus of timing to read a status value. The host apparatus transfers data and reads the status at a timing instructed by the interruption signal.

When the host apparatus issues a write command, the memory card 20 receives the write command through the external interface unit 1 and transfers it to the command analyzing unit 2. The command analyzing unit 2 analyzes the write command as "write eight sectors consecutively from the zeroth", and the analysis result data is input to the block size judging unit 4.

The block size judging unit 4 judges, with reference to the writable block size prestored in the writable block size storage area 7 and the analysis result data from the command analyzing unit 2, whether or not the specifications of the write command satisfy a condition that is set based on the writable block size.

Here, the explanation is provided on a case where a write block size is represented by the number of sectors, and a predetermined number of sectors (1 sector=512 bytes) is registered as a writable block size. In this case, if the writable block size is eight, the condition is the following.

Condition: {(starting sector number) %8=0} and {(the number of sectors as a write block size) %8=0}

In other words, the condition is satisfied when the starting sector, from which data is written and which is specified by a write command, is positioned to demarcate each sector group that is composed of as much sectors as the writable block size, and also when the write block size that is specified by the write command is an integral multiple of the writable block size.

Consequently, the write block size judging unit 4 executes a write command issued by the host apparatus only when both of the following conditions are met. One condition is that residue obtained by dividing, by eight, the starting sector number that is specified by the write command is zero. The other condition is that residue obtained by dividing, by eight, the number of sectors as a write block size that is specified by the write command is zero. In other cases, the block size judging unit 4 informs an error of the write command to the host apparatus. Here, when the write command is judged as executable by the block size judging unit 4, subsequent data from the host apparatus is written into the flash memory 6 through the data write unit 5.

In the aforementioned writable block size storage area 7, the number of sectors which make up an erase block of the flash memory 6 is prestored as a writeable block size. The following explains the writable block size.

Here, the explanation is provided for the memory card that contains only one flash memory. The explanation is also provided on a case where one erase block is composed of eight sectors, where a size of a write page of a flash memory is the same as that of a sector, and where eight is prestored as a writable block size. If a memory card contains two or more flash memories and consecutive sector numbers specified by the write command that is issued by the host apparatus are interleaved into two or more flash memories, (the number of sectors which make up an erase block of a flash memory)×(the number of flash memories) should be stored as a writable block size.

FIG. 6A and FIG. 6B show relationships between sectors and erase blocks.

FIG. 6A shows a relationship between sectors and erase blocks when a memory card includes only one flash memory. FIG. 6B shows a relationship between sectors and erase blocks when a memory card includes two flash memories: a flash memory 121 and a flash memory 122. In FIG. 6A and FIG. 6B, each number shows sector numbers, and rectangles with broken sides and rectangles with solid sides respectively show sectors and erase blocks. In FIG. 6B, since the sector numbers are interleaved into the two flash memories, the number of sectors that make up erase blocks is sixteen.

In this embodiment, as a result of a conditional judgment based on the writable block size, data is written only in units of blocks the number of which is an integral multiple of the number of erase blocks.

The following explains problems that occur when data is not written in units of blocks the size of which is an integral multiple of a size of erase blocks, with reference to FIG. 7.

FIG. 7 is a state transition diagram of erase blocks that make up the memory card. As shown in FIG. 7, each erase block is categorized into following six states.

[State A]: All of write pages that make up an erase block are writable. An erase block in this state can be used as a work block.

[State B]: Some of write pages that make up an erase block are writable, and some of write pages on which data has been written are valid pages.

[State C]: Some of write pages that make up an erase block are writable, and write pages on which data has been written are all invalid pages.

[state D]: None of write pages that make up an erase block is writable, and the write pages on which data has been written are all invalid pages.

[State E]: None of write pages that make up an erase block is writable, and some of the write pages on which data has been written are valid pages.

[State F]: None of write pages that make up an erase block is writable, and the write pages on which data has been written are all valid pages.

In FIG. 7, arrows indicate transitions. Arrows shown by broken lines indicate cases where the drag-in save occurs during a transition. Arrows shown by thick lines indicate transitions in a case where data is written only in units of erase blocks.

As shown in FIG. 7A, in the State A, the write pages that make up the erase block are all writable, and the erase block can transit to the State B and the State F.

In the State B, some of the write pages that make up an erase block are writable. However, some of the write pages on which data has been written are valid pages and the data can not be erased. Therefore, the erase block can transit to the State C, State E, and the State F.

Also, in the State C, some of the write pages that make up the erase block are writable. The write pages on which data has been written are all invalid pages, and the data can be erased. The erase block can transit to the State A and the State E.

In the State D, none of the write pages that make up the erase block is writable. However, the write pages on which data has been written are all invalid pages, in other words, an erase block to be erased. Therefore, it is possible to transit to the State A when the data is erased from the erase block.

In the State E, none of the write pages that make up the erase block is writable, and the write pages on which data has been written includes some valid pages. Therefore, the data cannot be erased. However, the erase block can transit from the State E to the State D if the valid write pages thereof are saved into the write pages of the erase block in the State A, B, or C from which data has been erased.

Further, in the State F, none of the write pages that make up the erase block is writable, and the write pages on which data has been written are all valid pages. However, the erase block can transit from the State F to the State E if some of the valid write pages thereof are saved into the write pages of another erase block, and can transit from the State F to the State D if all of the valid write pages thereof are saved into the write pages of another erase block.

The following describes a state where an empty block search occurs with reference to the state transition diagram in FIG. 7. First, three States, S1, S2, and S3 are defined.

A state (S1), in which the memory card is full of erase blocks, is composed of the State A, the State D, and the State F.

In a state (S2), in which data is written in units of small number of blocks, are blocks in the State A in the State S1 that have transited to the State B, E, and blocks in the State B further transit to the State E.

A state (S3) in which an empty block search occurs is a state where the State A does not exist.

When data is written in units of small number of blocks, the State of a memory card transits from S1 to S2 and to S3, and an empty block search occurs.

A task to search all of the erase blocks for invalid pages occurs in the State S3. This would make it difficult to write data at a high speed.

When searching empty blocks, it takes a relatively short time if invalid pages are detected from the erase blocks immediately. However, there are some cases where invalid pages are not detected until all of the erase blocks are searched. Therefore, the time required to detect empty blocks varies greatly.

It is accordingly preferable to repeat transitions "the State A→the State F→the State D→the State A" to prevent an empty block search from occurring and to realize a high-speed recording into a memory card.

In this embodiment, when a write command that is judged not to satisfy a condition based on the writable block size storage unit 7 by the write block size judging unit 4, the write block size judging unit 4 informs an error of the write command to the host apparatus. Therefore, it is possible to exclude writing of data not in units of erase blocks and to maintain a constant recording state of the memory card. Also it is possible to prevent the past recording state of the memory card from degrading the recording rate in the writing thereto afterward. For this reason, it is possible to guarantee the recording rate of the memory card without identifying the host apparatuses that recorded data to the memory card in the past.

The following explains the guaranteed write rate prestored in the guaranteed write rate storage area 8 of the memory card 20.

The guaranteed write rate is determined based on a lowest recording rate guaranteed on writing data into the memory card 20 and the write block size on which the guarantee of the lowest recording rate is premised. The host apparatus can read a writable block size and the guaranteed write rate from the memory card. It is accordingly possible to construct a more flexible system in which when a camera recorder compresses image signals and records the compressed image signals into the memory card, the compression rate is changed to meet the guaranteed write rate.

The following explains the buffer memory capacity data prestored in the buffer memory capacity storage area 9 of the memory card 20.

The buffer memory capacity data shows capacity of a buffer memory provided in the host apparatus. The buffer memory is used for the following purposes.

The first purpose is to shorten the time required for an error handling and for a retry process performed by the host apparatus when an error is generated on writing data into the memory card.

The second purpose is to smooth a variation in time required for a writing process by an algorithm of writing data into the memory card.

The error described in the first purpose mainly indicates a case where a defective sector is generated in the flash memory. The defective sector is generated with a probability of one in one hundred thousand writings.

It takes 100 ms for the memory card 20 to perform an error registration process and a retry process of writing when a defective sector is generated. Therefore, if, for example, a defective sector is generated three times per one recording of data into a memory card, a buffer memory having a capacity corresponding to 300 ms is needed. Also, in this case, the guaranteed write rate needs to be set slightly lower than a guaranteed write rate in a case where an error is not taken into account. The reason is that an overflow of the buffer memory may occur when data is recorded endlessly into the memory card. A relation between the buffer memory capacity data and the guaranteed write rate is obtained by performing a queue calculation in the system shown in FIG. 8.

The highest input rate of predetermined buffer memory capacity data is obtained from a probability of an error ($\rho$), a time required for error handling by the memory card (Tb), a time required for write process of the memory card when an error is not generated (Ta), and a time required to input predetermined blocks of data to the buffer memory (Tc). Then the buffer memory capacity data and the highest input rate are registered in the memory card as the guaranteed write rate.

With respect to the second purpose of the buffer memory, various algorithms are assumed as algorithms of writing data into the memory card. In an algorithm to write a conversion table of logical addresses and physical addresses into a memory card after predetermined blocks of data was written, the writing time of the conversion table is periodically added.

For example, in a case where the conversion table is registered each time a thousand erase blocks are written, an average value is registered as the guaranteed write rate, and a capacity corresponding to a time required to register the conversion table is registered in the buffer memory capacity data.

As described above, in a memory card that performs a real-time recording, by registering a necessary buffer memory capacity data and a guaranteed write rate in the memory card itself based on an error property of the memory card and a control algorithm, it is possible to establish a system that maximizes the performance of the memory card. Also, in a case where a memory card of different characteristic is included, it is possible for the host apparatus to respond flexibly by changing memory assignment and a compression rate of image signals, with reference to necessary information such as a buffer memory data and a guaranteed write rate prestored in ROM 19 of the memory card.

Second Embodiment

The following explains a memory card system according to the second embodiment of the present invention.

FIG. 9 shows a general structure of a memory card system according to the second embodiment.

As shown in FIG. 9, the memory card system is composed of the memory card 20 described in the first embodiment and a host apparatus 21 that records data into the memory card. Here the explanation is provided on a case where a camera recorder is used as the host apparatus 21.

The host apparatus 21 includes an image data input unit 10, a compressing unit 11, a buffer memory 12, a read-modify-write unit 13, and a controlling unit 14.

The image data input unit 10 is where digital image data is input.

The compressing unit 11 compresses the image data that is input through the image data input unit 10.

The buffer memory 12 temporarily stores the image data.

The read-modify-write unit 13 records the data read from the buffer memory 12 into the memory card 20, and performs a read-modify-write when recording the data into the memory card 20, the read-modify-write being described later.

The controlling unit 14 issues, when the memory card 20 is included in the host apparatus 21, a command to read the writable block size, the guaranteed write rate, and the buffer memory capacity data that are prestored in the memory card 20. Then, the controlling unit 14 reads these data and stores as a control parameter, and then controls the compressing unit 11, the buffer memory 12, and the read-modify-write unit 13 according to the control parameter.

The following explains how the camera recorder as the host apparatus 21 records in real time a digital image data input by an imaging device into the memory card 20.

The controlling unit 14 performs the following according to the control parameter read from the memory card 20 and stored therein. The controlling unit 14 changes the compression rate of the compression unit 11 to meet the guaranteed write rate, assigns the memory mounted in the host apparatus as the buffer memory for the memory card to meet the buffer memory capacity data, and issues a write command that meets the condition regarding the writable block size explained in the first embodiment. Here, when issuing a write command, the controlling unit 14 controls the read-modify-write unit 13 so that the write command to write data in units of blocks indicated by the writable block size is issued to the memory card.

The following describes a performance of the read-modify-write unit 13 under control of the controlling unit 14.

When a value shown by the writable block size that is stored as a control parameter is eight, data should be written in units of eight sectors (=four kilobytes). In this case, there is no problem if data to be recorded into the memory card is an integral multiple of four kilobytes. However, when recording twenty-two kilobytes of image data, the data should be divided into five four-kilobyte blocks and one two-kilobyte block. As a matter of course, it is acceptable to add two kilobytes of dummy data to the two-kilobyte block so that it becomes a four-kilobyte block. However, in a case where system data such as FAT (File Allocation Table) is recorded, it is not possible to add dummy data with this technique.

Therefore, there is a problem that when updating FAT with a memory card in which data can be written only in units of integral multiples of eight sectors, the host apparatus should possess data that is generated by mirroring FAT data of the memory card. The read-modify-write unit solves this problem by performing a read-modify-write.

FIG. 10 shows an image of how a read-modify-write is performed in a case where data is written in four sectors consecutively from the sector whose sector number is eight.

In FIG. 10, the data 201 indicates data to be written into the predetermined four sectors, the data 202 indicates data read from sectors of the memory card, and the data 203 indicates data that is actually written in the sectors of the memory card as a result of the read-modify-write.

As shown in FIG. 10, when writing data, the read-modify write-unit 13 reads data based on the number of sectors indicated by the writable block size from the memory card, in other words, identifies sectors to be written and other sectors (hereafter, referred to as the "sectors in pair") so that the total number of the sectors in pair coincides with the number of sectors indicated by the writable block size, and read the data 202 as the other sectors in the pair. Then the read-modify-write is completed after building up eight sectors of data by putting four sectors of data 201 to be written and four sectors of data 202 that is read from the memory card together, and then writing it into the memory card.

As described above, by performing the read-modify-write, the host apparatus does not need to possess a mirror data when updating a system data such as FAT.

Also, if applying the read-modify-write only when updating FAT in which a technique to add dummy data cannot be used. This makes it possible to control a degradation of a recording rate caused by reading data before writing it.

As described above, in a memory card system according to this embodiment, it is possible to guarantee a recording rate on recording data into the memory card by performing a control based on a writable block size, a guaranteed write rate, and a buffer memory capacity data that are prestored in the memory card.

Third Embodiment

The following explains a memory card 30 that is generated by partly deforming the memory card 20 of the first embodiment.

The memory card 20 divides, to prevent a recording rate from becoming lower than a predetermined rate, data into writable block sizes which are integral multiples of an erase block and accepts writings of data from the host apparatus only in units of integral multiples of the writable block sizes, and regards other writings as errors. Therefore, the host apparatus has a function to read the writable block size 7 stored in the ROM 19. On the other hand, a memory card 30 stores the writable block size not in the ROM 19 but in a nonvolatile re-writable memory that is different from the flash memory 6, and updates the writable block size under given conditions.

FIG. 11 shows a general structure of the memory card 30 according to the third embodiment. Here, in FIG. 11, components of the memory card 30 according to the present embodiment that are the same as the components of the memory card 20 according to the first embodiment are given the same reference numerals, and there are some parts explanations are omitted. Also, thick arrows show the flow of data from a host apparatus to be recorded into a memory card 30, and thin arrows show the flow of control signal or control data.

As shown in FIG. 11, the memory card 30 according to the third embodiment comprises an external interface unit 41, a command analyzing unit 42, a controlling unit 3, a flash memory 6, a writable block size storage area 47 that is a nonvolatile memory, and a ROM (Read Only Memory) 49 that includes a guaranteed write rate storage area 8 and a buffer memory capacity storage area 9.

Here, the external interface unit 41 has a function, in addition to a function of the external interface unit 1 described in the first embodiment, to accept and respond to a command that instructs to update a writable block size from the host apparatus.

The command analyzing unit 42 analyzes a command received by the external interface unit 41. If the command analyzing unit 42 analyzes a command as a command to read contents stored in the ROM 49, the command analyzing unit 42 reads the contents and sends the read contents to the host apparatus through the external interface unit 41 as a response against the command. Also, if the command instructs to update the writable block size, the command analyzing unit 42 performs a response process against the command that instructs an update of the writable block size which will be described later.

The writable block size storage area 47 is a part of a nonvolatile rewritable memory where a writable block size that indicates a block size in units of which a host apparatus can record data, and the same value as the value stored in the writable block size storage area 7 according to the first embodiment is set as an initial value.

The guaranteed write rate storage area 8 included in the ROM 49 is where a guaranteed write rate that shows the lowest recording rate guaranteed is prestored. Also, in the buffer memory capacity storage area 9, buffer memory capacity data that is requested to the host apparatus in order to assure the guaranteed write rate is prestored.

The write block size judging unit 4 included in the controlling unit 3 judges, in reference to the writable block size prestored in the writable block size storage area 47, whether a write block size specified by a write command that is analyzed by the command analyzing unit 42 is appropriate or not. If the write block size is appropriate, the write block size judging unit 4 instructs the data write unit 5 to write data according to the write command. If the block size is not appropriate, the write block size judging unit 4 sends a response to inform an error to the host apparatus through the external interface unit 41 and other units. How data is written based on a control by the controlling unit 3 has been explained in the first embodiment, therefore, an explanation is omitted.

The following explains the response process against the command that instructs an update of the writable block size.

FIG. 12 is a flow chart that shows the response process against the command that instructs an update of the writable block size.

The command that instructs an update of the writable block size is issued, with an appointed value for update of the writable block size, by the host apparatus.

When the command analyzing unit 42 receives the command that instructs an update of the writable block size, it obtains the specified value (Step S51) and judges if the specified value satisfies the predetermined condition or not (Step S52). If the result shows that the specified value does not satisfy the predetermined condition, the command analyzing unit 42 informs an error to the host apparatus, through the external interface unit 41 (Step S54). If the result shows that the specified value satisfies the predetermined condition, the command analyzing unit 42 registers the specified value in the writable block size storage area 47 as a new writable block size (Step S53).

The predetermined condition according to the Step S52 denotes that the initial value of the writable block size storage area 47 is eight indicating eight sectors, on a presupposition that the erase block size is 2 sectors. Also, on a presupposition that the specified value is determined according to the number of sectors, the predetermined condition denotes the specified value is smaller than the write block size stored in the writable block size storage area 47 at a moment that the specified value is determined, and also four or two.

Consequently, the host apparatus can update the writable block size of the memory card 30 by setting the specified value of the write block size as four or two. However, once the host apparatus updates the writable block size to four, it cannot return the write block size to eight, and in this case, if the host apparatus further updates the writable block size, it can update the writable block size only to two. Also, after the host apparatus updates the writable block size to two, it cannot return the writable block size to eight or four.

As described above, when the host apparatus updates a writable block size of the memory card 30 to four, a recording rate becomes lower than the recording rate when data is written in units of eight sectors. However, even when the memory card 30 is included in another host apparatus, the host apparatus can read from the memory card 30 that the write block size is four sectors.

In the guarantee write rate storage area 8, in addition to the guaranteed write rate in relation to the initial writable block size, a guaranteed write rate that shows lowest recording rate guaranteed according to units of block sizes to comprise each writable block size after an update, in other words, a conditional guarantee write rate, may be prestored.

<Complement>

Although the memory card and the memory card system of the present invention are described based on the preferred embodiments as above, the present invention should not be limited to the above embodiments. For example, the following modifications can be applied to the memory card.

(1) In the embodiments above, a writable block size is the same as the size of an erase block. However, a lowest recording rate is guaranteed if the writable block size is an integral multiple, such as twice or quadruple, of the erase block. It should be noted here that, in the above embodiments, the values of the writable block size are cited merely by way of example. For example, in a case where an erase block is 128 kilobytes and one sector is 512 bytes, the writable block size is, when represented by the number of sectors, 256.

(2) The condition the write block size and the write starting sector number should meet in relation with the writable block size described in the first embodiment includes an assumption that the write starting sector number is divisible by the number of the sectors shown by the writable block size. However, if the host apparatus that issues a write command specifies the write starting sector number so that the write starting sector number becomes an integral multiple of the number of sectors shown by the writable block size, the memory card does not have to perform a judgment concerning the condition based on the starting sector number. Also, values of the writable block size and the write block size are not limited to be expressed by the number of sectors, and can be expressed by the number of bytes, and the like.

(3) Also, it is acceptable to have the memory card store, in addition to the guaranteed write rate described in the first embodiment, guaranteed write data equivalent to each write block size that is an integral multiple of the writable block size, in other words, guaranteed write data under condition (hereafter referred to as the "conditional guarantee data", so that the host apparatus can receive the conditional guaranteed write data.

(4) Although in the above embodiments, an example in which a write block size is set in relation with a size of an erase block is provided, a writable block size can be set so that the writable block size becomes an integral multiple of a write page. Also, in the future, a flash memory in which an erase block comprises relatively few write pages may be developed. In this flash memory, it is highly possible that a drag-in save is performed each time data is recorded, therefore, a diminishment of a recording rate due to the empty block search is not likely to occur. Therefore, it is acceptable to set the writable block size at 512 bytes that is equivalent to one sector, and to prestore, for each of most relevant block size according to a characteristic of the memory card, this block size and a conditional guaranteed write rate when data is written in units of those sizes.

(5) Although, in the third embodiment, an issue of a command to instruct an update of the writable block size by the host apparatus leads the memory card to judge if the writable block size can be updated or not and to update the writable block size if it can be updated, the command to instruct an update of the writable block is not necessarily used. For example, in the wake of an issue of a write command specifying a write block size that is smaller than a writable block size by the host apparatus, in a case where the memory card receives a response indicating forcible execution of the write command by the host apparatus after the memory card sends a response to inform an error to the host apparatus, the memory card may judge whether or not the write block size can be updated and updates the writable block size if it can be updated.

(6) The memory card described in the third embodiment may be modified such that the guaranteed write rate is stored in a nonvolatile rewritable memory, the writable block size is updated according to a command to instruct an update of the writable block size, and the value of the guaranteed write rate is rewritten to a value that shows an inability of guarantee. With this arrangement, in a case where a host apparatus that equip a memory card for a purpose in which a lowest recording rate does not need to be guaranteed, once updates the writable block size, another host apparatus that includes this memory card later is able to recognize that a lowest recording rate is not guaranteed with this memory card by reading a guarantee write rate. Therefore, for example, the host apparatus can give notice to users or perform other processes.

(7) The memory card described in the third embodiment may receive a command to erase data in all of erase blocks in a flash memory. When the memory card receives the command, it may set again an initial setting value (eight, as one example) as a writable block size after the data in all of the erase blocks are erased. With this arrangement, when a host apparatus updates a writable block size of a memory card to a value that is smaller than the initial setting value and writes data, another host apparatus that includes this memory card later can write data with the initial lowest recording rate being guaranteed if the data in all of the erase blocks are erased.

INDUSTRIAL APPLICABILITY

The memory card and the memory card system of the present invention are able to guarantee a recording rate when writing data. Therefore, the memory card and the memory card system are suitable for a continuous and a high-speed data recording, and can be used in a business-oriented image field where a real-time recording should be assuredly performed.

The invention claimed is:

1. A memory card comprising:
a flash memory;
an external interface unit operable to transfer data to and from a host apparatus;
a storage unit that prestores a predetermined writable block size; and
a controlling unit operable, when receiving through the external interface unit a write command which specifies a write block size, to (a) judge whether the write block size satisfies a predetermined condition in relation to the writable block size and (b) perform a control operation concerning whether to permit writing of data into the flash memory according to a result of the judgment,
wherein the writable block size is a predetermined integral multiple of a size of an erase block in the flash memory,
wherein the predetermined condition is that the write block size is an integral multiple of the writable block size, and
wherein the controlling unit performs the control operation to write data into the flash memory only if the predetermined condition is satisfied.

2. The memory card of the claim 1, further comprising:
a transmission unit operable to read the writable block size from the storage unit and transmit the read writable block size to the host apparatus through the external interface unit.

3. The memory card of the claim 2, wherein
the storage unit further prestores a guaranteed write rate that indicates a lowest recording rate guaranteed as long as data is written into the flash memory in units of the writable block size, and
the transmission unit further reads the guaranteed write rate from the storage unit and transmits the read guaranteed write rate to the host apparatus through the external interface unit.

4. The memory card of claim 3, wherein
the storage unit prestores a conditional guaranteed write rate that indicates a lowest recording rate guaranteed as long as data is written into the flash memory in units of a certain integral multiple of the writable block size, and
the transmission unit further reads the conditional guaranteed write rate from the storage unit and transmits the read conditional guaranteed write rate to the host apparatus through the external interface unit.

5. The memory card of claim 3, wherein
the storage unit further prestores a buffer memory capacity data that is predetermined to indicate a capacity required for a buffer memory that is equipped in the host apparatus, to guarantee the lowest recording rate indicated by the guaranteed write rate, and
the transmission unit further reads the buffer memory capacity data from the storage unit and transmits the read buffer memory capacity data to the host apparatus through the external interface unit.

6. The memory card of claim 3, further comprising:
an update unit operable, responding to a request from the host apparatus that is received through the external interface unit, to rewrite the writable block size prestored in the storage unit so that the writable block size becomes smaller than the original writable block size, and then update the guaranteed write rate according to the rewritten writable block size.

7. The memory card of claim 2, further comprising:
a writable block size update unit operable, responding to a request from the host apparatus that is received through the external interface unit, to rewrite the writable block size prestored in the storage unit so that the writable block size becomes smaller than the original writable block size.

8. A memory card system comprising:
a memory card comprising:
  a flash memory;
  an external interface unit operable to transfer data to and from a host apparatus;
  a storage unit that prestores a predetermined writable block size; and
  a controlling unit operable, when receiving through the external interface unit a write command which specifies a write block size, to (a) judge whether the write block size satisfies a predetermined condition in relation to the writable block size and (b) perform a control operation concerning whether to permit writing of data into the flash memory according to a result of the judgment; and
a host apparatus that transfers data to and from the memory card,
wherein the host apparatus includes a read-modify-write unit operable, when a size of a first data to be written into the memory card does not reach the writable block size, to (a) read a second data from a flash memory that is included in the memory card through the external interface unit, and (b) put the first data and the second data together to generate a third data so that the third data has the same size as the writable block size, and then (c) transmit a write command to the memory card to write the third data into the flash memory.

* * * * *

UNITED STATES PATENT AND TRADEMARK OFFICE
CERTIFICATE OF CORRECTION

PATENT NO. : 7,433,245 B2 Page 1 of 1
APPLICATION NO. : 10/591161
DATED : October 7, 2008
INVENTOR(S) : Takeshi Otsuka et al.

It is certified that error appears in the above-identified patent and that said Letters Patent is hereby corrected as shown below:

Title Page

Item (22), "Mar. 28, 2006" should read --Mar. 28, 2005--.

Signed and Sealed this

Seventeenth Day of February, 2009

JOHN DOLL
*Acting Director of the United States Patent and Trademark Office*